United States Patent
Altmann

(12) 
(10) Patent No.: US 6,600,118 B2
(45) Date of Patent: Jul. 29, 2003

(54) ACTUATING SYSTEM INCLUDING A MODULE ELEMENT FOR ASSEMBLY IN A PANEL

(75) Inventor: Markus Altmann, Moos-Bankholzen (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 77 days.

(21) Appl. No.: 09/915,856

(22) Filed: Jul. 26, 2001

(65) Prior Publication Data

US 2002/0011403 A1 Jan. 31, 2002

(30) Foreign Application Priority Data

Jul. 26, 2000 (DE) .......................................... 200 12 942

(51) Int. Cl.[7] .................................................. H01H 9/02
(52) U.S. Cl. ........................................ 200/295; 200/296
(58) Field of Search .............................. 200/295, 296; 439/357

(56) References Cited

U.S. PATENT DOCUMENTS 4,398,073 A * 8/1983 Botz et al. .................. 200/295
5,250,770 A * 10/1993 Cummings .................. 200/295
5,881,865 A * 3/1999 Jang ........................ 200/295 X

FOREIGN PATENT DOCUMENTS

| DE | 3543885 C1 | 3/1987 |
| DE | 19518169 A1 | 11/1996 |
| DE | 19901892 A1 | 7/1999 |
| GB | 2032263 A | 5/1990 |
| JP | 10264683 A | 10/1998 |
| JP | 11278102 A | 10/1999 |

\* cited by examiner

*Primary Examiner*—Renee Luebke
(74) *Attorney, Agent, or Firm*—Tarolli, Sundheim, Covell & Tummino L.L.P.

(57) ABSTRACT

An actuating system for a vehicular interior comprises a panel (12) with a front face and a module element (14) for assembly in an opening (16) of the panel (12). The panel (12) has side walls (18) which are perpendicular to the front face. The panel (12) and the module element (14) have cooperating latching elements which comprise a detent (26) and a latching edge (22). The detent (26) is configured on an elastically deflectable tongue (24) and comprises a ramp surface (28) cooperating with the latching edge (22).

5 Claims, 1 Drawing Sheet

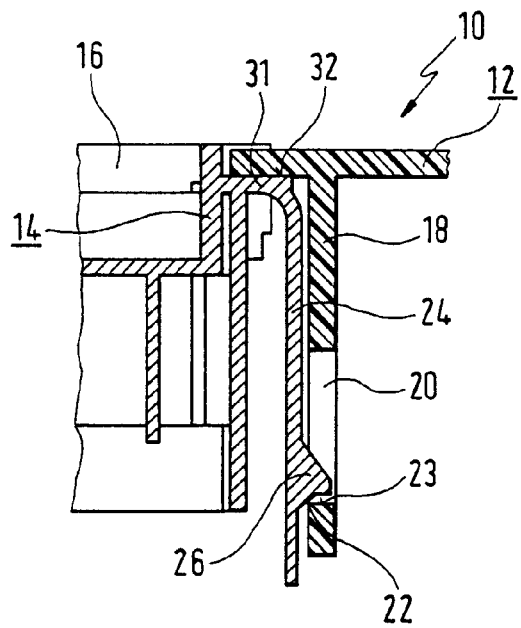
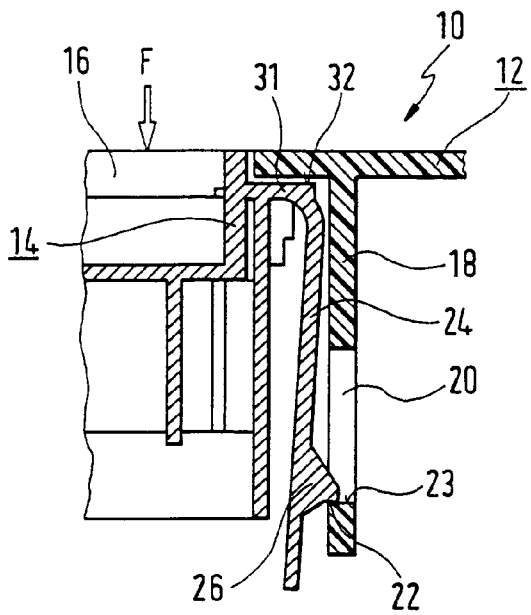
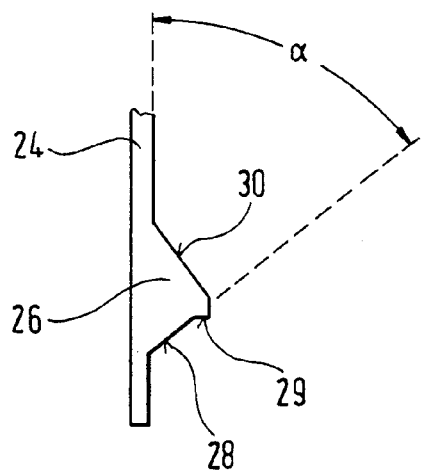

ACTUATING SYSTEM INCLUDING A MODULE ELEMENT FOR ASSEMBLY IN A PANEL

TECHNICAL FIELD

The invention relates to an actuating system for a vehicular interior, the system comprising a panel and at least one module element for assembly in an opening of the panel.

When securing a module element such as an electric switch with a push-button to a panel in a vehicular interior it must be first of all ensured that the element is securely latched in place in the panel and insensitive to shock and vibration during driving. Secondly, however, a certain clearance needs to be provided to compensate for production tolerances. It is furthermore important that should the module element be forced unduly it must not become unlatched. Prior art arrangements for securing a module element in a panel that satisfied the above requirements hardly allow repeated installation and removal of the module element, for example for purposes of repair.

BACKGROUND OF THE INVENTION

The invention provides an actuating system for a vehicular interior in which the module element is securely latched in place in the panel irrespective of any production tolerances and which will not unlatch from the cover means even when unduly forced and in which the module element can be installed and removed as often as is required without any difficulty.

This is achieved in an actuating system for a vehicular interior, the system comprising a panel with a front face and at least one module element for assembly in an opening of the panel. The panel has side walls which are perpendicular to the front face. Cooperating latching elements of the panel and the module element comprise a detent and a latching edge. The detent is configured on an elastically deflectable tongue and comprises a ramp surface cooperating with the latching edge. It is this cooperation of the detent with the latching edge that ensures that the module element is securely latched in place in the panel irrespective of any production tolerances and which will not unlatch from the panel even when unduly forced.

In accordance with one advantageous embodiment the panel has a stop for the module element which is parallel to the front face of the panel.

Preferably, the stop is located at the side of the panel opposite the front face.

In a preferred arrangement the elastically deflectable tongue with the detent is provided on the module element, that the latching edge is formed on an edge of an opening in the side wall of the panel and the tongue is tensioned between the stop of the panel and the latching edge.

Preferably, the elastically deflectable tongue with the detent and the module element are molded in one piece to thus achieve a simple, low-cost assembly.

BRIEF DESCRIPTION OF THE DRAWINGS

The invention will now be detailed by way of an example embodiment as shown in the attached drawings in which:

FIG. 1 is a section partial view of the operating control system in accordance with the invention for a vehicular interior;

FIG. 2 is a section partial view of the operating control system in accordance with the invention as shown in FIG. 1 in a forced situation;

FIG. 3 is a partial view on a magnified scale of how the elastically deflectable tongue is configured at one end of FIG. 1.

DETAILED DESCRIPTION OF THE PREFERRED EMBODIMENT

Referring now to FIG. 1 there is illustrated an actuating system 10 for a vehicular interior including a panel 12 such as a dash-board and a module element 14. Such as an electric switch with a push-button for actuation of the switch. Provided at the front face of the panel 12 is an opening 16 for inserting the module element 14. A wall 18 of the panel 12 perpendicular to the front face is provided with a further opening 20 at which a latching edge 22 and a latching surface 23 are provided. The latching edge 22 and the latching surface 23 cooperate with an elastically deflectable tongue 24 molded integrally with the module element 14. The elastically deflectable tongue 24 is evident in a partial view on a magnified scale from FIG. 3 and comprises at its lower end, relative to FIG. 1, a detent 26 with a ramp surface 28 which is slanted relative to the latching surface 23 at the opening 16. The angle $\alpha$ between the elastically deflectable tongue 24 and the ramp surface 28 may be, for example, 60°. A ramp surface 30 of the detent 26 opposite the ramp surface 28 is opposingly slanted, serving as an insertion guide on assembly. The ramp surface 28 merges at its right-hand end, relative to the FIG. 1, in a step 29 oriented parallel to the latching surface 23. The portion 31 of the module element 14 in which the elastically deflectable tongue 24 translates into the remaining module element 14 is oriented parallel to the front face of the panel 12 and is thus also parallel to a stop 32 located on the side of the panel 12 opposite the front face.

The detent 26 cooperates with the latching edge 22 so that the detent 26 protrudes into the opening 20 of the wall 18 perpendicular to the front face and the ramp surface 28 contacts the latching edge 22. At its upper end, relative to the FIG. 1, the portion 31 of the module element 14 contacts the stop 32 of the panel 12 so that the elastically deflectable tongue 24 is tensioned between the stop 32 of the cover means 12 and the latching edge 22.

The functioning of the actuating system as described is as follows: In the assembly, as shown in FIG. 1, the elastically deflectable tongue 24 is fixedly tensioned between the stop 32 of the panel 12 and the latching edge 22, thus securing the module element 14 in a defined position in the panel 12, the ramp surface 28 thereby compensating for any production tolerances. When a force F acts on the module element 14 substantially perpendicularly to the front face of the panel 12, the elastically deflectable tongue 24 is moved along the ramp surface 28 downwards, relative to FIG. 2, and thereby deflected to the left in FIG. 2. Since the detent 26 is still in contact with the latching edge 22 the module element 14 is in fact guided on the panel 12. When unduly forced the module element 14 is only able to move over a certain distance along the wall 18 perpendicular to the front face of the panel, this distance being dictated by the length and slant of the ramp surface 28 merging in the step 29 perpendicular to the latching surface 23. On attaining this step 29, the step 29 positively contacts the latching surface 23 to thus prevent the elastically deflectable tongue 24 and thus the module element 14 from being further deflected downwards. The module element 14 thus cannot become unlatched from the panel 12 even if it is unduly forced.

What is claimed is:

1. An actuating system for a vehicular interior, said system comprising a panel with a front face and at least one module element for assembly in an opening of said panel, said panel having side walls which are perpendicular to the front face, said panel and said module element having cooperating latching elements which comprise a detent and a latching edge, said detent being provided on an elastically deflectable tongue and comprising a first ramp surface cooperating with said latching edge, said panel comprises a stop for said module element parallel to said front side, said stop is located at the side of said panel opposite said front face, said elastically deflectable tongue with said detent is arranged on said module element, said latching edge being formed at an opening in said side wall of said panel, and said tongue being tensioned between said stop of said panel and said latching edge.

2. The actuating system as set forth in claim 1, wherein said detent comprises a second ramp surface opposite said first ramp surface, said second ramp surface being slanted in a direction opposite to said first ramp surface.

3. The actuating system as set forth in claim 2, wherein said detent has an end with a step that cooperates with a latching surface on at least one of said side walls.

4. The actuating system as set forth in claim 3, wherein said one side wall has an opening and said latching surface is located on an edge of said opening and is oriented substantially parallel to the front face of said panel.

5. The actuating system as set forth in claim 1, wherein said module element comprises an electric switch and a push-button for actuating said switch.

* * * * *